Oct. 17, 1933.  R. GOLD ET AL  1,930,797

ELECTROMOTOR

Filed June 25, 1929

Inventors:
Richard Gold
Julius Schmaus
By
Pennie Davis Marvin & Edmonds
attorneys Patented Oct. 17, 1933

1,930,797

UNITED STATES PATENT OFFICE 1,930,797

ELECTROMOTOR

Richard Gold and Julius Schmauss, Vienna, Austria

Application June 25, 1929, Serial No. 373,588, and in Austria July 16, 1928

8 Claims. (Cl. 172—36)

Our invention relates to improvements in electric motors.

Efforts have already been made, by various ways and means, to solve the problem of constructing electric motors which are to serve, for instance, for driving pumps, in such way that they can operate direct in the water or other liquid to be raised without having to fear break-downs. It has been suggested, for instance, to insert a fluid tight partition in the form of a thin walled tube in the space between the stator and rotor of the electric motor (particularly in the case of three-phase motors with squirrel-cage rotors), which tube closes tightly around the casing of the stator, so that the winding of the stator is then completely closed in. The hollow space of circular annular section containing the stator was to be filled with an insulating oil, and as the rotor can be so produced as to be unaffected by water or other fluids, such a motor can be plunged into the liquid which is to be delivered by the pump driven by the motor straight away.

Now the object of the present invention is to make the partition between rotor and stator as thin as possible in order that quite a narrow space between rotor and stator shall suffice to take this partition, thus enabling the dimensions of the parts of the motor coming into question to be reduced as far as possible.

The tube inserted in the space between rotor and stator which may consist of a suitable metal, metal alloy or non-metallic substance is to be produced with a thickness of wall being only a small fraction of a millimeter. Of course, a tube with such thin walls is easily deformed, and means must be provided to prevent such deformation if the certainty of operation of the electric motor is to be maintained; the rotor must not, of course, come into contact with the thin plate tube, as in such case it would soon be destroyed, which would consequently in turn destroy the sealing of the stator chamber, in which is to be found the winding connected with the system.

The thin partition tube is subjected, on the one hand from the space in which the rotor is located, to the hydrostatic pressure of the liquid in which the motor works, and on the other hand, from the space in which the stator winding is to be found, to the pressure of the medium filling the hollow space of the stator, which medium expands consequent on the heat generated during operation. In order to avoid a detrimental deformation of the thin tubular partition care must be taken to see either that the parts forming the stator chamber and contents thereof, including the substance filling the hollow space can expand as freely as possible under the influence of the heat generated in operation, or that the expansions caused by the heat of all these parts is so small that practically they need not be taken into consideration. These two main possibilities can also be simultaneously turned to account with one another.

Care must also be taken to see that the thin partition-tube which seals the stator chamber from the rotor is less susceptible to compressive stresses which emanate from the space in which the rotor operates than to compressive stresses which emanate from the interior of the stator chamber. Every tube is, of course, more easily able to take up internal pressure than external pressure, as the wall of such a tube is mainly under tensile stress from the internal pressure, whilst any pressure taking effect from the outside tends to cause the wall of the tube to collapse inwards. In the case of an extremely thin walled tube as is to be used here, this difference in the capacity for withstanding internal and external pressure is naturally emphasized. It will be seen from this that care must be exercised to avoid high pressure taking effect on the thin-walled tubular partition from the stator chamber and that if the difference between this pressure and the hydrostatic pressure taking effect from the other side is able to deform the tube towards the rotor, it will necessarily quickly be destroyed as a consequence of the friction of the rotor.

According to our invention the stator chamber in which the stator winding is to be found, contains at least partly a solid substance capable of remaining solid also at the maximum temperature rise of the motor during operation. By using such a solid substance as filling material in the stator chamber we avoid the drawbacks caused by filling up the stator chamber with a liquid alone as has been suggested heretofore.

In order that our invention may be the better understood, we will now proceed to describe the same in relation to the accompanying drawing, reference being had to the letters and figures marked thereon; like letters refer to like parts in the various figures in which:—

Fig. 1 is an axial section through a motor constructed according to our invention;

Fig. 2 a cross section through the rotor of the said motor drawn on an enlarged scale and taken on the line A—B of Figure 1;

Figure 1:
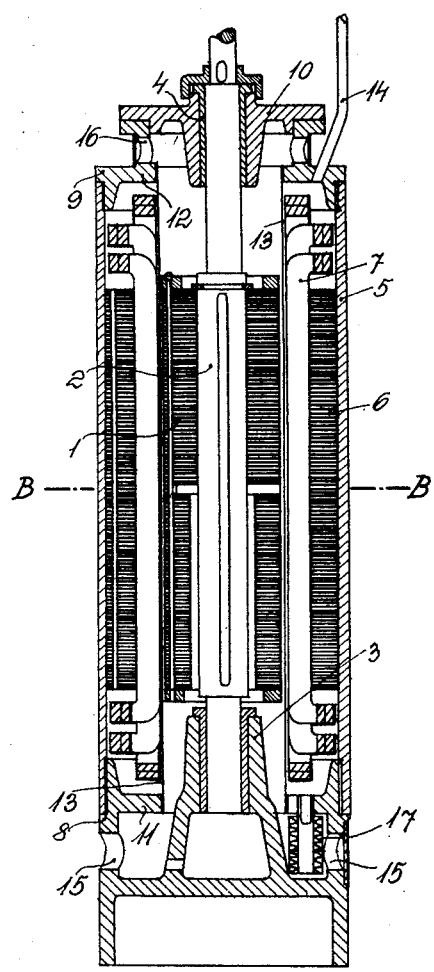
Figure 2:
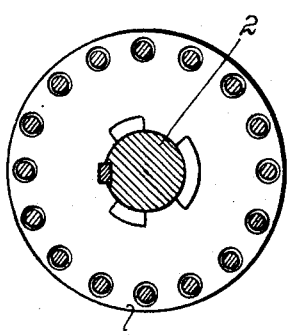

The rotor 1 is carried on the shaft 2, which is housed in the bearings 3 and 4 of the casing 5. This housing 5 also encloses the stator 6 with its windings 7 and consists in this case of a tubular part and end pieces 8 and 9, the end piece 9 being closed by a cover 10 containing the bearing 4. The end pieces 8 and 9 have flanges 11 and 12, respectively, a thin-walled partition tube 13 being tightly mounted in the inner periphery thereof. By this means a chamber of circular annular section, closed on all sides, is formed inside the casing 5 by the two flanges 11 and 12 and the thin-walled partition tube 13, inside which chamber the stator with its windings is enclosed. The current conducting cable 14 of the stator can be passed through in a perfectly tight and simple manner at any point of the casing. The end pieces 8 and 9 of the housing may be provided with apertures 15 and 16, respectively, through which water can penetrate from outside into the room of the rotor. These apertures 15 and 16 also may be provided with filters or may be entirely omitted.

Figure 3:
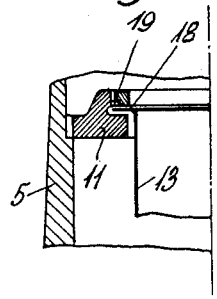
Fig. 3 shows means for tightly fixing the ends of the thin-walled tubular partition.

Figure 3 shows the manner in which the thin-walled partition-tube 13 is tightly closed to the stator casing. Each end of the cylindrical wall 13 is provided with a flange 18 which is placed against the flange 11 and 12, respectively, of the motor casing 5 and fixed thereto by the pressure ring 19.

In accordance with our invention the hollow space inside the stator chamber is filled at least partly with solid substances capable of remaining solid also at the maximum temperature rise occurring during operation. As solid substances may be employed, such substances as are fluid at ordinary or higher temperatures and can be introduced into the stator chamber at ordinary or other pressure, after which they then pass or are converted into the solid form to remain solid even at the maximum temperatures occurring during operation. Such solid filling substances may be composed for instance of artificial resinous substances, silicates, sulphates and the like.

Filling bodies in powder or granular form may also be used to fill up the hollow space of the stator chamber. The spaces between the particles of powder or between the grains can either remain free, i. e. be filled up with air or by a gas, or these spaces can also be filled out with a liquid or solid substance, in which connection the solid substances to be used should again be such as can be introduced in a liquid state. The filling substances need not, moreover, be absolutely electrically insulating, as the windings of the stator are of course in any case provided with insulation. It is more advantageous, however, if the filling substances are as good conductors of heat as possible, in order that the heat generated in the stator chamber during operation shall be conducted as quickly as possible to the outside. As especially good conductors of heat are also as a rule good conductors of electricity, the risk exists in using such good conductors of heat as filling substances owing to the possibility of strong eddy-currents occurring in the filling substances.

It is therefore necessary to select as filling substances such substances as show as little electrical conductivity as possible with the utmost possible capacity for conducting heat.

In employing solid filling substances, it is therefore to be recommended to use certain resistance metals or alloys which comply particularly well with the condition last expressed.

The formation of eddy currents may also be reduced by covering the good conducting, granular or ball-shaped filling substances with a thin insulating layer, f. i. by enamelling, varnishing or the like.

If the hollow spaces of the stator chamber are entirely filled with a solid filling substance, the thin partition-tube will be supported against the hydrostatic pressure of the external liquid, the solid filling medium taking up the hydrostatic pressure and transmitting it to the outer walling of the stator. As, furthermore, the expansion from heat of certain filling substances is so small that it can be ignored, the deformation of the thin partition-tube due thereby to the expansion of the contents of the stator chamber is in turn so small that it can be ignored, and such a motor can operate satisfactorily without having to fear break-down when immersed at both small and large depths in a liquid. If other filling substances also are used for the hollow spaces of the stator chamber, it is to be observed that, if the motor is to operate at only a slight depth in a liquid, the hydrostatic pressure taking effect on the thin tubular partition will also be comparatively low, so that the partition-tube is easily able to take this pressure. So long as the pressure arising thereby in the interior of the stator chamber is not greater than the hydrostatic pressure of the surrounding liquid taking effect from the other side on the thin-walled partition-tube, no risk will exist of an undue stress being put upon the tubular partition. If, however, an excess of pressure arises in the interior of the stator chamber beyond the hydrostatic pressure, the thin partition-tube may very easily be pressed in, and the consequence of this would be that the rotor would rub on the tubular partition and grind through the latter in a short time.

Now in order to prevent any such increase in pressure in the stator chamber, devices can be provided which ensure an automatic regulation of the pressure inside the stator chamber and a compensation of the pressures on both sides of the wall of the thin partition-tube.

In case a liquid fills up the spaces between the granular substance in the stator chamber, a pressure regulating chamber provided with flexible walls, such as the diaphragm box 17, in Fig. 1 may be connected to the stator chamber, the easily expansible hollow space of said box communicating with the stator chamber and being surrounded externally by the liquid in which the motor is plunged. This box 17 is consequently under the influence on the one side of the pressure in the stator chamber and on the other side under the influence of the external hydrostatic pressure. It is possible to arrange in this manner that there is at all times a perfect compensation of the two pressures, so that consequently equally strong pressure is exerted on the thin-walled partition-tube from both sides and thus no cause arises for any deformation of the said tube.

Naturally, such pressure compensation devices may also be of a different design. They may be arranged either inside or outside the motor casing or an enlargement of the motor casing itself may fulfil this object.

If the motor is only intended for use in comparatively shallow depths, the thin-walled partition-cylinder is able to take the pressure of the external liquid itself without any further support.

In case a gaseous medium fills up the spaces between the granular substance in the stator chamber, it may be advisable to connect up with the stator chamber gas-filled expansion vessels which may have rigid walls and which only fulfil the purpose of placing greater space at disposal for the filling medium contained in the stator chamber, so that the increasing pressure in the interior of the stator chamber as a consequence of the expansion of the filling medium by heat cannot rise to an unadmissible degree. Such gas-filled expansion vessels with rigid walls render a compensation of pressure possible in a simple manner.

Such expansion chambers can be arranged either inside or outside the motor casing or an enlargement of the motor casing itself may fulfil this object.

Figure 4:
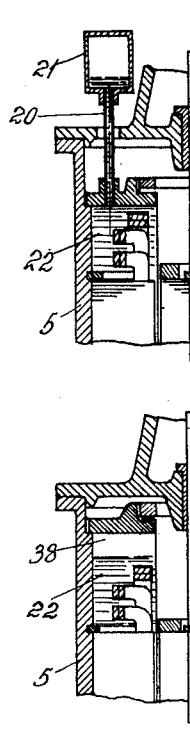
Figure 4 is a sectional fragmentary detail of a modification of the structure shown in the lower left hand corner of Figure 1.

Fig. 4 shows by way of example a vertical arrangement, wherein an expansion vessel 21 with rigid walls is placed outside the motor casing 5 and communicates with the stator chamber 22 by means of the pipe 20. The fluid or gaseous medium marked in Fig. 4 by dotted lines fills up the spaces between the granular substance filling the stator chamber 22 and extends through the pipe 20 to the interior of the expansion vessel 21.

Figure 5:
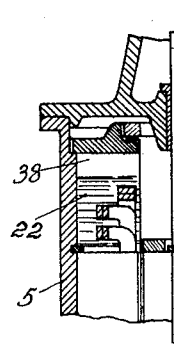
Figure 5 is a similar view of another modification thereof.

In Fig. 5 an enlargement of the motor casing 5 itself serves as expansion chamber, the room 38 fulfilling the object of the expansion vessel 21 shown in Fig. 4.

If the spaces left by the solid substance in the stator chamber are filled with a gaseous medium, it is possible to produce a pressure below that of the atmosphere in the stator chamber, namely a pressure which, so long as the normal temperature rules in the stator chamber, is less than the hydrostatic pressure of the external liquid or less than the external atmospheric pressure. In this connection it is possible to arrange the conditions in such manner that if any increase in pressure arises during the working as a consequence of the heating, the ensuing pressure either does not exceed the hydrostatic pressure of the external liquid or not beyond defined limits.

The use of a pressure below that of the atmosphere can also be combined with the use of gas filled expansion chambers as described above, which renders it possible to make the dimensions of these expansion chambers very small. By choosing a pressure sufficiently below that of the atmosphere, such expansion chambers are naturally not necessary at all.

Any such pressure below that of the atmosphere in the interior of the stator chamber naturally also carries with it the consequence that the walling of the thin partition-tube is kept continually pressed tightly to the stator plate supporting it which is of great advantage as in this case the thin partition-tube is secured against any contact with the rotor.

If the motor is intended to be plunged to any considerable depth, the hydrostatic pressure of the fluid surrounding it may be so great as to prevent the thin-walled partition tube withstanding it without counter-pressure from the interior of the stator chamber. Care is therefore to be taken that as perfect a compensation of pressure as possible on both sides of the walling of the partition-tube is obtained, in which connection it is naturally also necessary to take into consideration the variability of the pressure in the interior of the stator chamber as a consequence of the expansion from heat occurring during operation. All the means described above may be used for the regulation of pressure in the interior of the stator chamber.

The motors designed according to our invention, which may be used for the direct drive of pumps plunged into water, in crude oil (oil wells) or such like can be arranged both with vertical and horizontal shafts. They can also, without having to fear breakdowns, work in gas-filled atmospheres which would otherwise be injurious to the windings.

Having now particularly described and ascertained the nature of our said invention and in what manner the same is to be performed, we declare that what we claim is:—

1. An electric motor adapted for submerged duty, comprising a rotor, a stator, a casing surrounding said stator, a thin cylindrical wall arranged in the air gap between said stator and rotor and forming with the casing of liquid tight stator chamber of substantially annular cross-section, and a filling material in said stator chamber, said material being in the solid phase, or state of matter, and being capable of remaining in this solid phase at the very maximum temperature rise of the motor during operation, said filling material being divided into grains.

2. An electric motor as set forth in claim 1, in which the said filling material is finely divided in the form of a powder.

3. An electric motor as set forth in claim 1, in which the said filling material in the stator chamber has a high heat-conductivity together with a small electrical conductivity.

4. An electric motor as set forth in claim 1, in which the said filling material in the stator chamber consists of electric resistance-material.

5. An electric motor as set forth in claim 1, in which the grains of the said divided filling material are coated with a thin, electrical-insulation layer to reduce the eddy-currents.

6. An electric motor adapted for submerged duty, comprising a rotor, a stator, a casing surrounding said stator, a thin cylindrical wall arranged in the air gap between said stator and rotor and forming with the casing a liquid tight stator chamber of substantially annular cross-section, and a filling material in said stator chamber, said material being in the solid phase, or state of matter, and remaining in this solid phase at the maximum temperature rise of the motor during operation, said filling material being divided into grains and the spaces left between said grains containing a gaseous medium at a pressure sufficiently low to prevent the said cylindrical wall from being materially deformed even at the maximum temperature rise of the motor.

7. An electric motor as set forth in claim 6, in which the pressure of the said gaseous medium even at the maximum temperature rise of the motor is always lower than the pressure outside the said cylindrical wall.

8. An electric motor adapted for submerged duty, comprising a rotor, a stator, a casing surrounding said stator, a thin cylindrical wall arranged in the air gap between said stator and rotor and forming with said casing a liquid-tight stator chamber of substantially annular cross-section, a filling material in said stator chamber, said material being in the solid phase, or state of matter, and remaining in the solid phase at the maximum temperature rise of the motor during operation, said filling material being divided into grains, a liquid filling up the spaces left between said grains, and means for equalizing the pressure inside the said stator chamber with the pressure outside thereof, whereby the said cylindrical wall is never put under load.

RICHARD GOLD.
JULIUS SCHMAUSS.